(12) United States Patent
Mukherjea et al.

(10) Patent No.: US 6,415,282 B1
(45) Date of Patent: Jul. 2, 2002

(54) METHOD AND APPARATUS FOR QUERY REFINEMENT

(75) Inventors: Sougata Mukherjea, San Jose; Kyogi Hirata; Yoshinori Hara, both of Sunnyvale, all of CA (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/064,062

(22) Filed: Apr. 22, 1998

(51) Int. Cl.[7] .............................................. G06F 17/30
(52) U.S. Cl. ............................................... 707/3; 707/6
(58) Field of Search ............................. 707/33.6, 500, 707/501, 513, 521, 526, 104; 382/162, 165, 181

(56) References Cited

U.S. PATENT DOCUMENTS

| | | | | |
|---|---|---|---|---|
| 5,751,286 A | * | 5/1998 | Barber et al. | 707/4 |
| 5,821,945 A | * | 10/1998 | Yeo et al. | 345/440 |
| 5,852,823 A | * | 12/1998 | De Bonet | 707/6 |
| 5,920,856 A | * | 7/1999 | Syeda-Mahmood | 707/3 |
| 6,088,483 A | * | 7/2000 | Nakano et al. | 382/209 |

FOREIGN PATENT DOCUMENTS

| | | |
|---|---|---|
| JP | 7-271801 | 10/1995 |
| JP | 8-153121 | 6/1996 |
| JP | 8-221439 | 8/1996 |
| JP | 8-235160 | 9/1996 |
| JP | 8-329106 | 12/1996 |
| JP | 9-179707 | 7/1997 |

OTHER PUBLICATIONS

Salton, et al. "Introduction to Modern Information Retrieval," McGraw–Hill, 1983.
van Rijsbergen, "Information Retrieval," Butterworths, 1979.
Michelle Q Wang Baldonado and Terry Winograd, "SenseMaker: An Information–Exploration Interface Supporting the Contextual Evolution of a User's Interests" ACM SIG-CHI '97 Conference on Human Factors in Computing Systems, pp. 11–18, Mar., 1997.
Chia–Hui Chang and Ching–Chi Hsu, "Customizable Multi–Engine Search Tool with Clustering" Proceedings of the Sixth International World–Wide Web Conference, pp. 257–264, Apr. 1997.
A. Del Bimbo and P. Pala, "Shape Indexing by Structural Properties" International Conference on Human Factors in Computing Systems, pp. 370–377, Jun., 1997.
Douglass R. Cutting, et al., "Scatter/Gather: A Cluster–based Approach to Browsing Large Document Collections" Proceedings of the ACM SIGIR '92 Conference on Research and Development in Information Retrieval, pp. 318–329, Jun., 1992.
Myron Flickner et al., "Query by Image and Video Content: The QBIC™System" IEEE Computer, 28(9):23–31, Sep., 1995.
Marti A. Hearst and Chandu Karadi, "Cat–a–Cone: An Interactive Interface for Specifying Searches and Viewing Retrieval Results using a Large Category Hierarchy" Proceedings of the ACM SIGR '97 Conference on Research and Development in Informational Retrieval, Jul., 1997.

(List continued on next page.)

*Primary Examiner*—Sanjiu Shah
*Assistant Examiner*—Alford W. Kindred
(74) *Attorney, Agent, or Firm*—Sughrue Mion, PLLC

(57) ABSTRACT

A method and apparatus for providing a user interface for refining a query applied to a database of images, where a Query Result Visualization Environment allows the user to organize the search results using various techniques. For example, the search results may be clustered on the basis of text, image or URL. The members of the resulting clusters may then be utilized by the user to refine the query to be applied to the database of images.

40 Claims, 8 Drawing Sheets

OTHER PUBLICATIONS

Kyoji Hirata and Yoshinori Hara, "The Concept of Media–Based Navigation and Its Implentation on Hypermedia System "Miyabi"" NEC Research and Development, vol. 35, No. 4, pp. 410–420, Oct., 1994.

Rajiv Mehrotra James E. Gary, "Similar–Shape Retrieval In Shape Data Management" IEEE Computer, pp. 57–62, Sep., 1995.

Miller, "Wordnet; A Lexical Database for English," Communications for the ACM, 38(11):39–41, Nov., 1995.

Sougata Mukherjea et al., "Towards a Multimedia World–Wide Web Information Retrieval Engine" Proceedings of the Sixth International World–Wide Web Conference, pp. 177–188, Apr., 1997.

Peter Pirolli et al., "Silk from a Sow's Ear: Extracting Usable Structures from the Web" Proceedings fo the ACM SIGCHI '96 Conference on Human Factors in Computing Systems, pp. 118–125, Apr., 1996.

James Pitkow and Peter Pirolli, "Life, Death, and Lawfulness on the Electronic Frontier" Proceedings of the ACM SIGCHI '97 Conference on Human Factors in Computing Systems, pp. 383–390, Mar., 1997.

* cited by examiner

Retrieved Images for URL:
www.majorleaguebaseball.com/october/

*1 Retrieved Images.*

◪
hong kong asia china shopping tourists ocean red
⊘
irrawaddy mandalay asia burma rivers
◪
napa valley helena winery picnic calistoga yountville
◪
vienna
◪
alaska anchorage glacier bear portage knowles coastal
◪
venice crown jewel cipriani masks canel
FIG. 7a
Retrieved Images for Topic: *irrawaddy mandalay asia burma rivers*
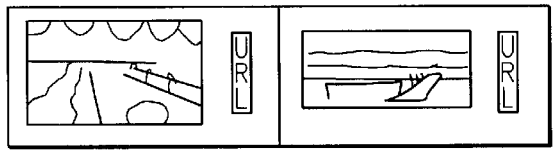
2 Retrieved Images.
FIG. 7b
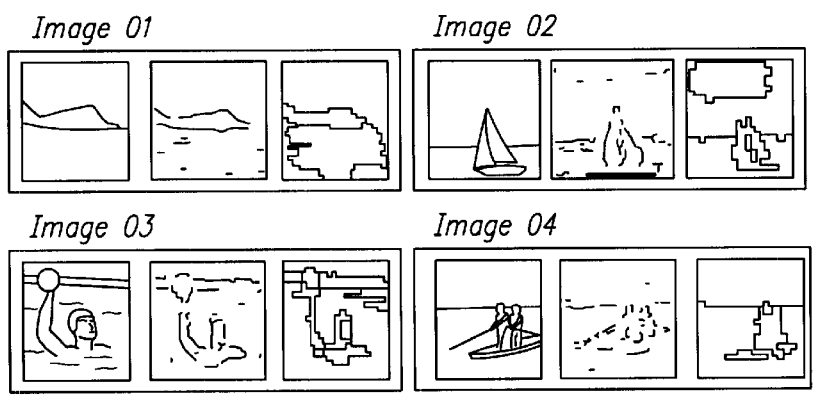
FIG. 8

METHOD AND APPARATUS FOR QUERY REFINEMENT

BACKGROUND OF THE INVENTION

1. Field of the Invention

The present invention relates generally to the field of querying a database of images and particularly to providing an interface for organizing the results of queries applied to a database of images.

2. Description of the Related Art

Search engines are some of the most popular and widely accessed sites on the World Wide Web (WWW) because they allow a user to find information of interest. These engines gather textual information about resources on the Web and build up indices. The indices allow for the retrieval of documents containing user specified keywords. Another method of searching for information on the Web utilizes subject-based directories, which provide a useful browsable organization of information.

However, with the explosive growth of information that is available on the WWW, most queries applied to the search engines result in a large number of retrieved documents. This leads to a key limitation suffered by most of the popular search engines available today. More specifically, most search engines show the results of a query as pages of scrolled lists. If a large number of documents are retrieved, scrolling through such lists to find documents of interest to the user is extremely tedious and not at all user friendly.

An image search engine, called Advanced Multimedia Oriented Retrieval Engine (AMORE), developed by the present inventors at NEC, allows the user to specify an image and find images that are visually similar to it. See Mukhetjea et al., "Towards a Multimedia World-Wide Web Information Retrieval Engine," Proceedings of the Sixth International World-Wide Web Conference, pages 177–188, April, 1997. In AMORE the user can specify keywords, where all the images relevant to the keywords are retrieved. However, as more and more images are indexed, AMORE is suffering from the same problems affecting traditional text search engines. More specifically, a query presented by the user of the search engine may result in a large number of retrieved images. Many user queries result in more than 100 retrieved images. As with other search engines, AMORE shows a few of the retrieved images per page and allows the user to go to other pages of retrieved images. This is shown in FIG. 1. Obviously, this is not a very user-friendly way of displaying search results to the user of the search engine.

Various searching and clustering techniques have been proposed to attempt to make systems more user-friendly. However, most have focused on text-based mechanisms. For example, clustering has been an emerging information retrieval tool. See Salton et al., "Introduction to Modern Information Retrieval," McGraw-Hill, 1983; Van-Rijsbergen, "Information Retrieval," Butterworths, 1979. The focus has been on the use of text clustering to speed up the searching process. Instead of comparing all documents in a large collection to find the relevant documents, such efforts have focused on initially comparing only a representative cluster vector for each cluster with the search request. Thereafter, only documents from clusters which matched favorably are compared. Clustering is also useful for browsing large online collections of text as shown by a scatter/gather technique. See Cutting et al., "Scatter/Gather: A Cluster-based Approach to Browsing Large Document Clusters," Proceedings of the ACM SIGIR '92 Conference on Research and Development in Information Retrieval, pages 318–329, June, 1992. Once again, this effort focuses on browsing a text collection, rather than an image collection.

In some instances, clustering has been used for searching large image databases as a pre-processing step to filter out non-interesting images. This reduces the number of images to be processed by more computer-intensive fine matching procedures. In addition, using the classification results produced by clustering, users can roughly grasp the contents of the entire image database and use this information for their interaction with the image retrieval system. Image clustering can be based on various image features such as colors, textures, shapes, etc. For example, Hirata et al., "The Concept of Media-based Navigation and Its Implementation on Hypermedia System "Miyabi,"" NEC Research and Development, 35(4):410–420, 1994, discusses a technique that focuses on color information in an image. Color values from the image are extracted and mapped on the HLS color spaces. Based on the results, users can filter out the images before searching. On the other hand, the work described in Del Bimbo et al., "Shape Indexing by Structural Properties," International Conference on Human Factors in Computing Systems, page 370–377, June, 1997, clusters by shape similarity. Using multi-scale analysis, a hierarchical structure of shape is extracted. Based on this structure, searching capabilities are provided. However, this method assumes that boundary analysis correctly extracts the boundaries of objects in the image. However, this is very difficult to do for WWW images containing many objects. Similarly, image clustering using feature vectors based on moment invariant (See Flickner et al., "Query by Image and Video Content: The QBIC System," IEEE Computer, 28(9):23–31, September, 1995) or boundary features (See Mehrotra et al., "Similar-Shape Retrieval in Shape Data Management," IEEE Computer, pages 57–62, September, 1995) also assumes the correct extraction of objects (or input by a user). Therefore, it is very hard to apply these techniques to the WWW. Additionally, each of these techniques focuses on providing only a single cluster mechanism. The techniques do not address providing a user-friendly interface.

The search techniques are also being applied to the WWW. Research at Xerox Palo Alto Research Center (PARC) uses clustering to extract useful structures from the WWW. See Pirolli et al., "Silk from a Sow's Ear: Extracting Usable Structures from the Web," Proceedings of the ACM SIGCHI '96 Conference on Human Factors in Computing Systems, pages 118–125, April, 1996; Pitkow et al, "Life, Death and Lawfulness on the Electronic Frontier," Proceedings of the ACM SIGCHI '97 Conference on Human Factors in Computing Systems, pages 383–390, March, 1997. The clusters are determined by various criteria like co-citation analysis. Clustering by textual similarity to organize the results of Web text search engines is described in Chang et al., "Customizable Multi-Engine Search Tool with Clustering," Proceedings of the Sixth International World-Wide Web Conference, pages 257–264, April, 1997. However, such implementations also fail to provide a user friendly user interface.

Examples of interfaces which have been developed for viewing information retrieval results include SenseMaker (See Baldonado et al., "SenseMaker: An Information-Exploration Interface Supporting the Contextual Evolution of a User's Interest," Proceedings of the ACM SIGCHI '97 Conference on Human Factors in Computing Systems, pages 11–18, March, 1997) and Cat-a-Cone (See Hearst et al., "Cat-a-Cone: An Interactive Interface for Specifying Searches and Viewing Retrieval Results using a Large Category Hierarchy," Proceedings of the ACM SIGIR '97 Conference on Research and Development in Information Retrieval, July, 1997). These articles, as well as those discussed above are hereby incorporated herein by reference.).

SenseMaker is an interface for information exploration across heterogeneous sources in a digital library. Sense-Maker allows the user to interactively change the level of granularity and the organizational dimensions of a collection of documents that match the user's interest. Cat-a-Cone is a 3D interface that allows a user to search and browse a large category hierarchy and the associated documents. The documents and the categories can be viewed concurrently. However, as with other systems, SenseMaker and Cat-a-Cone both focus on the text properties of documents and also present differing text organizational structures.

Other Web Image Search engines, such as Excalibur's Image Surfer (http://isurf.yahoo.com) and Webseer (http://webseer.cs.uschicago.edu) show retrieved images in successive HTML pages. However, no technique for organizing the search results or query refinement is possible. Other popular text search engines, such as Alta Vista (http://www.altavista.digital.com) and Excite (http://www.excite.com) allow query refinement. Excite can group search results by Web sites. Moreover, both Excite and Alta Vista use co-occurrence analysis to show other relevant keywords for the query terms. While the technique is useful, there is no mechanism to find out the actual documents that correspond to the different keywords. The keywords are merely used to refine a search by including or excluding them. Allowing the user to see the actual documents/images that belong to a cluster would be more useful.

SUMMARY OF THE INVENTION

To overcome these and other difficulties, the present invention is directed to a method and apparatus for providing an interface for query refinement. The present invention provides to a user of a search engine a Query Result Visualization Environment (QRVE), a user interface which allows the user to refine the results of an original query by using variously clustered results of the original query. The results may be clustered using text, a primary object (or shape) or universal resource locator (URL). The members of the clusters may then be used to formulate the refined queries.

BRIEF DESCRIPTION OF THE DRAWINGS

The above objects and advantages of the present invention will become more apparent by describing in detail preferred embodiments thereof with reference to the attached drawings in which:

FIGS. 7(a) and 7(b) show search results grouped according to keyword, along with the images for one of the groups, in accordance with an embodiment of the present invention.

FIG. 8 shows the results of an object extraction procedure used to categorize images by objects.

DETAILED DESCRIPTION OF THE INVENTION

A preferred embodiment of a method and apparatus for providing an interface for refining a query, according to the present invention, is described below in detail with reference to the accompanying drawings. It is to be noted that while the following discussion is presented in the context of the AMORE search engine, the present invention is not so limited. The present invention may be applied to a variety of search engines for the WWW, multimedia databases, etc.

Figure 1:
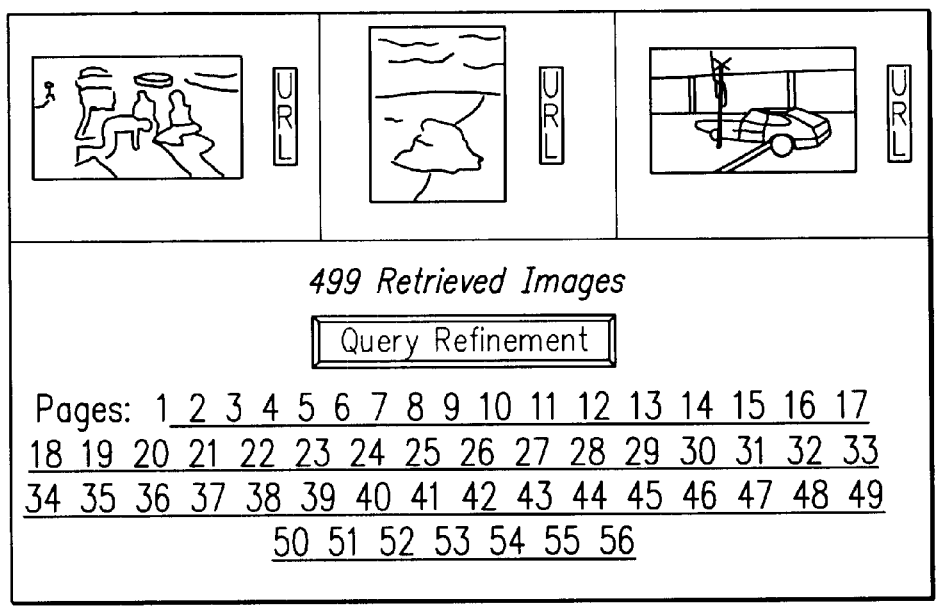
FIG. 1 shows the results of a traditional search using the AMORE search engine.
Figure 2:
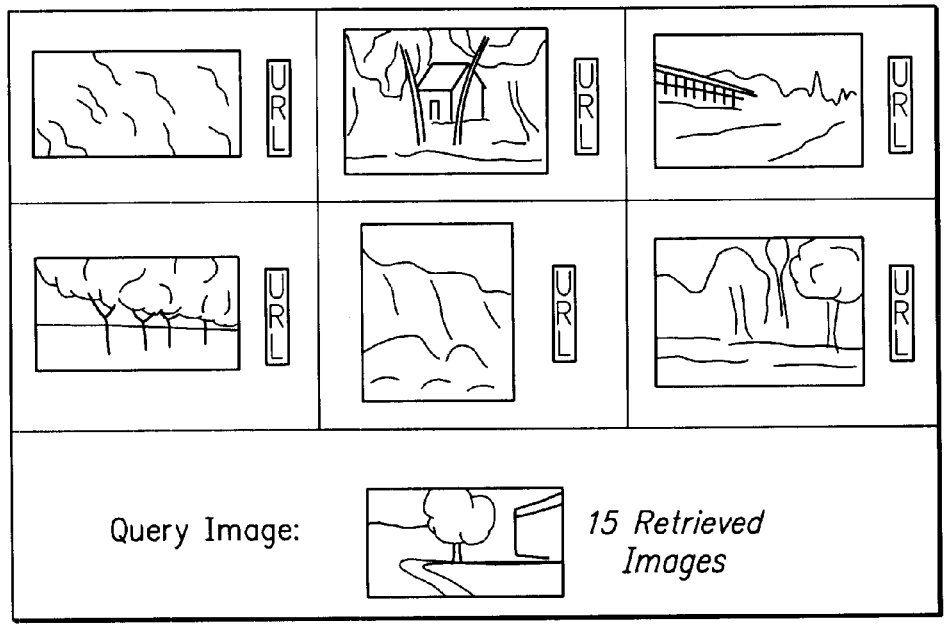
FIG. 2 shows the results of a combined image and keyword query.

A brief overview of how a search engine, such as AMORE, operates is first presented. Implementing a search engine involves two phases, indexing and querying. Several systems exist that allow full-text indexing of Web sites. The indices allow the user to search the indexed sites using any combination of keywords. Systems that can index images in a database based on various image characteristics, such as shape and color have also been developed. Image indexing allows for the retrieval of images in the database that are similar to a user specified image. AMORE integrates the two types of systems by allowing for the retrieval of Web documents containing one or more keywords and/or images similar to a user specified image. FIG. 2 shows the results of a search in which an integrated keyword and image query was issued.

The first step to implementing a search engine involves indexing the database of Web sites, documents or images. After text and/or image indices have been built, users can issue queries. The queries can contain one or more keywords or an image. The text and image search can also be combined by using Boolean logic (e.g. "and" or "or"). However, a problem arises when the database to be searched becomes very large. Queries may result in a large number of retrieved images.

The present invention provides an interface to the user of a search engine for refining queries. The interface, called a Query Result Visualization Environment (QRVE), allows the results of a search to be organized in various ways. For example, the images retrieved as a result of a search query can be grouped or clustered by the Web sites (URL) from which they were retrieved, by how many keywords they have in common, or by their composition, where images with similar composition form a single cluster.

In accordance with the present invention, when a user issues a query, the user has the option of grouping the results in one of several ways, for example, by URL, text (or keywords) or composition. The QRVE is a graphical user interface (GUI) presented to the user of a system upon the execution of a query. The QRVE presents to the user the cluster information for the retrieved images, where the results are clustered or grouped in accordance with the grouping method selected by the user. Each cluster is represented in the QRVE by a glyph (graphical element). When the user requests the details of a cluster, by clicking on the glyph representing the cluster, the images of the cluster are shown to the user. The clustered search results of the initial query issued by the user may then be used to refine the search. The details of refinement will be discussed below.

Figure 3:
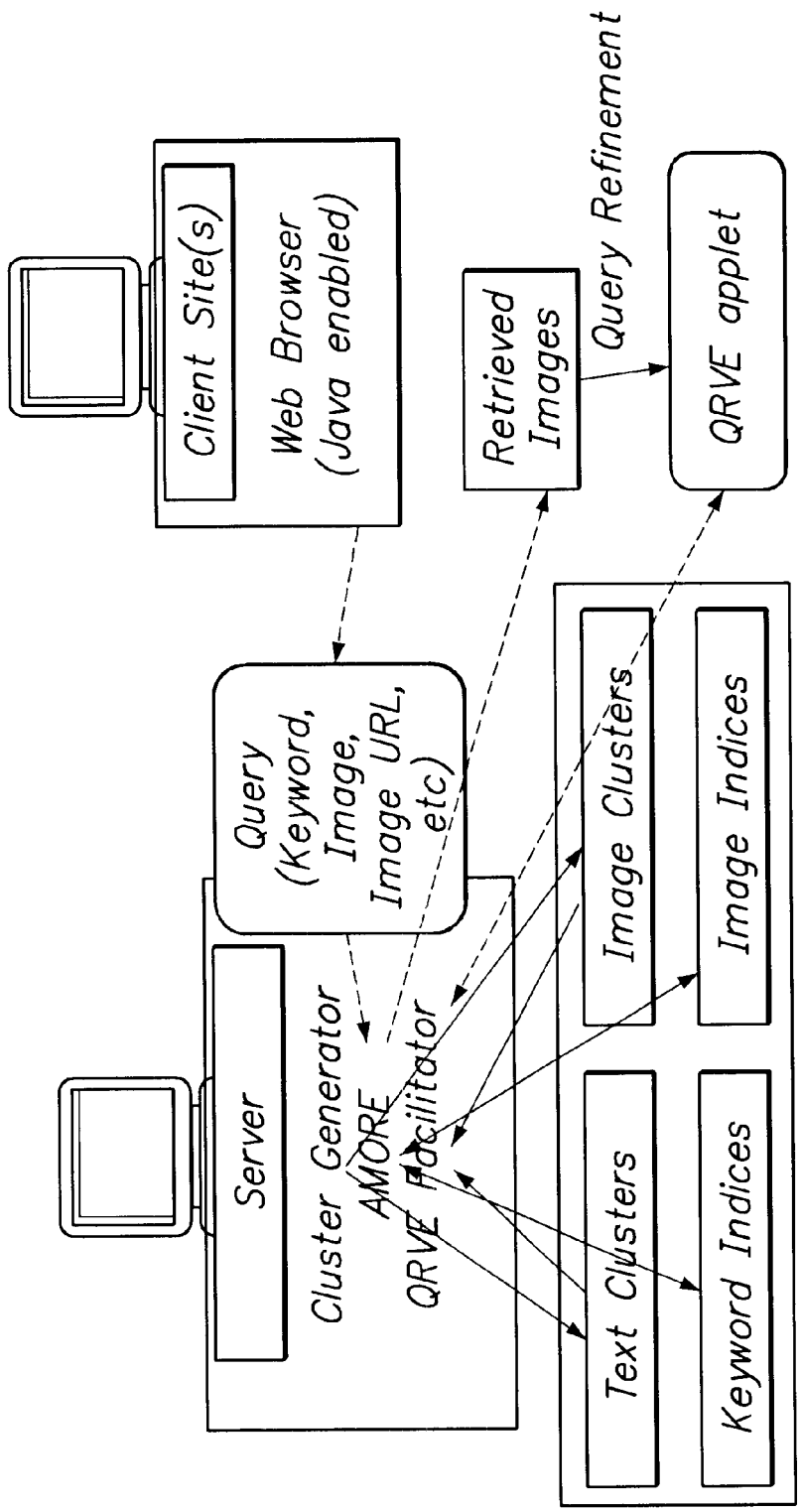
FIG. 3 shows the architecture of the system implementing the present invention.

The architecture of a system upon which the present invention may be implemented is shown in FIG. 3. After the AMORE search engine completes indexing the images in the keyword and image indices, the cluster generator uses the keyword and image clustering algorithm to generate the text and image clusters, respectively. The QRVE Facilitator retrieves the cluster information for images retrieved in response to a query. This information is used to create the visualization, where each cluster is represented by a glyph. When the user clicks on a glyph representing a particular cluster, a request is sent by the QRVE applet to the facilitator. The facilitator interacts with the text and image clusters to determine the images for the cluster clicked by the user. Those images are shown in the results frame of the client browser.

Figure 4A:
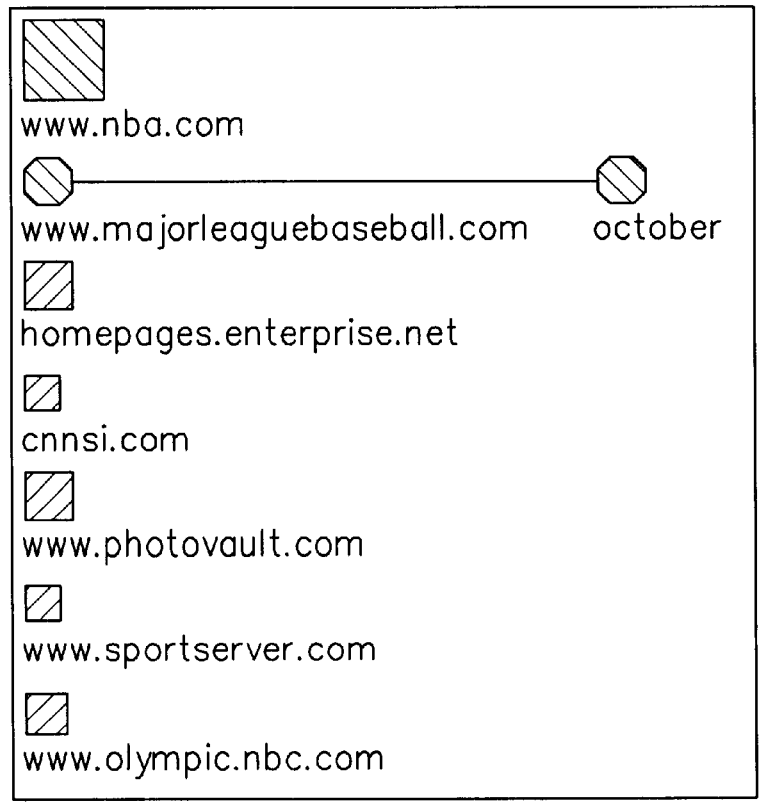
FIGS. 4(a) and 4(b) show search results grouped according to URL and an image from a selected URL in accordance with an embodiment of the present invention.
Figure 4B:
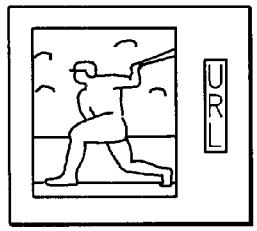

The details of each of the methods of clustering will now be discussed. First, grouping by URL will be discussed. Suppose a user is interested in a picture of a baseball player whose last name is "Jordan." Unfortunately, she does not remember his first name. If a keyword search is initiated with the last name "Jordan" in the sports category of a search engine, a large number of images is retrieved. Not surprisingly, most of the retrieved images are of basketball star Michael Jordan. Browsing through all of the retrieved images to find the one desired by the user can be painful. The QRVE of the present invention provides a solution, as shown in FIGS. 4(a) and 4(b), which show two parts of a window. Initially, it is assumed that the user chose the method of clustering the query search results by URL. The window in FIG. 4(a) shows the search results categorized by URLs clusters for the images retrieved. Each URL cluster is represented by a glyph. The QRVE for the keyword only search using the term "Jordan" shows that images from seven Web sites were retrieved. The desired image of the baseball player will most probably be in the web site www.majorleaguebaseball.com. When the user clicks on the glyph associated with this web site, the retrieved picture of baseball player Brian Jordan is shown in FIG. 4(b). The user can then initiate a refined search using this image of Brian Jordan as the query.

Figure 5A:
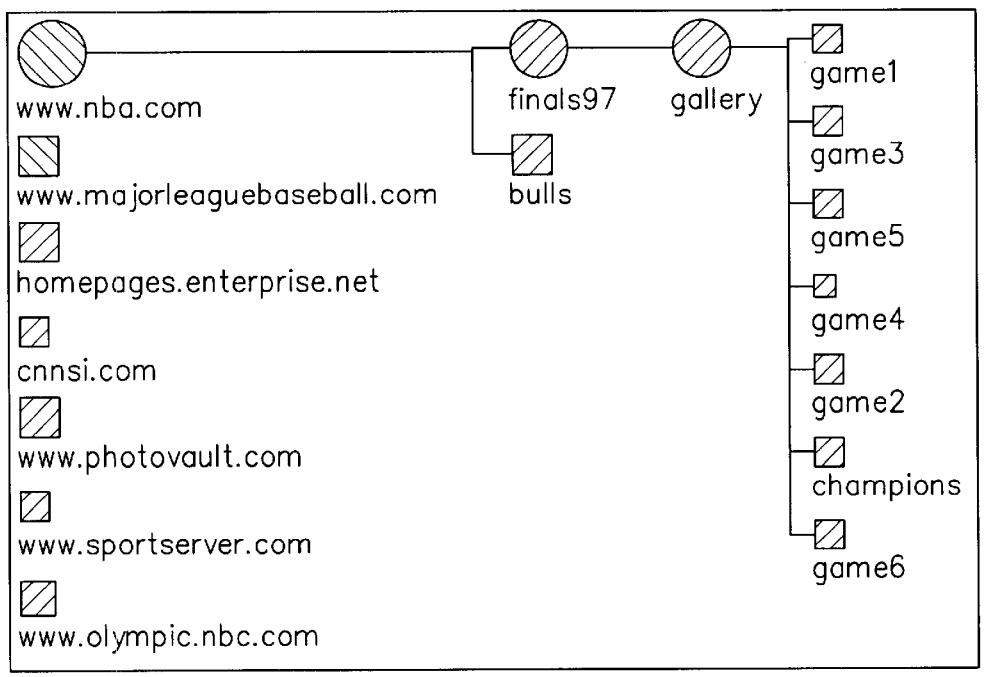
FIGS. 5(a) and 5(b) show the hierarchical structure of a web site and images from a selected section of the web site.
Figure 5B:

The hierarchical structure of web sites from which images are retrieved may also be shown to the user. This is especially useful if a large number of images from one particular web site are retrieved. For example, for the keyword only search using the term "Jordan", many images of Michael Jordan are retrieved from the web site www.nba.com. When the user clicks on the glyph associated with this web site, the images and the directory structure of the web site are shown in a results frame. If the user is only interested in images from the 1997 NBA finals, she can click on the glyph for the subdirectory finals 97. The resultant scenario is shown in FIGS. 5(a) and 5(b), which together comprise a window. Note that in FIG. 5(a) the glyph is a circle on the path chosen by the user and is a square for other paths. The size of the glyph is proportional to the number of images retrieved in the cluster. The cluster of images is shown in FIG. 5(b). Additionally, the color of the glyph may be comprised of two basic color components, where the magnitude of the first color component is proportional to the maximum number of keywords in the documents containing the retrieved images of the group which is represented by the glyph. The magnitude of the second color component is proportional to the maximum image similarity.

If images from many unknown web sites are retrieved, or if a search is simply being performed on a database of images, clustering by URL is not very useful. Instead, clustering by keywords may be used. The text clustering procedure is explained as follows.

Several preprocessing steps are carried out. First, during an index phase, various heuristics are used to assign keywords to images. The image name, the title of the page from which the image came, and a section of the text before and after the image are assigned to the image.

Second, the documents are represented in a vector space model. For example, let V be the set of unique words assigned to the images of a category. Then each image can be represented by a vector of length |V| in which the absence of a word is indicated by 0 and the presence of a word is indicated by a positive number, known as term weight. The term weight reflects the importance of the word for the image. Traditional text retrieval using Inverse Document Frequency as the term weight has been found to be quire effective. See Salton et al., "Introduction to Modem Information Retrieval," McGraw-Hill, 1983. In the present invention, the term weight of a word is determined not only by its frequency but also by where it occurs. Thus, if a word occurs in the name of the image itself, its term weight will be greater than for a word occurring in the text surrounding the image. Note that before forming the vectors, universal common words, such as "and" and "the" are removed, as well as words that are very common (occurring in more than half the documents) for the category (like the terms "game" and "team" in the "sports" category).

Third, a similarity matrix is formed by calculating the similarity between each pair of images. The similarity between two images is measured by the cosine of the angle between the vectors representing them. This is normalized so that, for each pair of images, the similarity is a value between 0 and 1. If a category has a large number of images, the matrix will be huge. Therefore, in accordance with the present invention, a sparse matrix is used and the similarity value is stored only if it is greater than a threshold.

Figure 6:
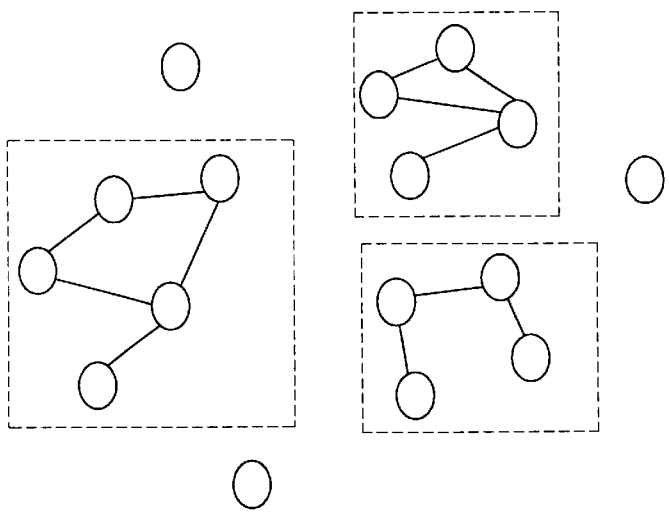
FIG. 6 shows the text cluster formation technique in accordance with an embodiment of the present invention.

Fourth, clustering is described as follows in conjunction with FIG. 6. Each image is considered to be a node in a graph, shown in FIG. 6 as a circle. A link, shown in FIG. 6 as a line connecting nodes, exists between two nodes in the graph if the similarity between the two corresponding images is greater than a threshold. Initially, the threshold is set at 0.1. Then the connected components in the graph are found. A connected component is a set of nodes such that each node is linked to at least one other member of the set, shown by the dotted rectangles in FIG. 6. The set of nodes is selected to be as large as possible, i.e. all of the connected nodes are selected to be part of the connected component. The set of nodes in a connected component form a cluster. This single-link cluster formation technique has been extensively used in information retrieval and found to be one of the most appropriate. See Van-Rijsbergen, "Information Retrieval," Butterworths, 1979, Chapter 3 for details. Then, if a cluster contains a large number of documents and the threshold value is less than the maximum possible value of 1.0, the threshold value is increased by 0.05 and the above clustering process is repeated until a desirable number of documents is contained in the cluster.

Fifth, cluster topics are determined. The clusters are represented in the QRVE by the main topic of the clusters. The topic of a cluster is determined by the words that appear in most of the images of the cluster. Since adverbs, prepositions, etc. are not very interesting, they are not allowed to be cluster topics. Wordnet can be used to determine the figure of speech of a word. See Miller, "Wordnet:

A Lexical Database for English," Communications of the ACM, 38(11):39–41, November, 1995. Moreover, if a word appears as a topic in many clusters, it is removed as a topic word.

Grouping by keywords is useful to semantically organize the images retrieved for an image search, as shown in FIG. 7(a). Each cluster is represented by a glyph and the main topics of the cluster are shown at the bottom of the glyph. From the cluster topics, the user gets an idea of the types of images that will be present in the cluster. For example, the cluster with the topics "burma", "irrawady", etc. will have pictures of Burma (the Irrawady is a river in Burma) as shown in FIG. 7(b), where FIGS. 7(a) and 7(b) together occupy a window. Besides issuing another search with a retrieved image from one of the clusters, the user can also refine the search by looking at all the images of a cluster. Since the clusters are formed by text analysis, by refining, text and image searching are smoothly integrated. Even if the user does not combine text and image searching during the querying phase, they are combined during the browsing phase. It should be noted that text clustering is also useful to organize the results of a keyword search if many images are retrieved.

Yet another clustering option provided in the QRVE is by image composition. During image indexing, AMORE extracts the visual characteristics of the images automatically for content-based image retrieval. The present invention focuses on the compositional similarity of the objects in the images during clustering. To classify the images based on the composition of the objects, two steps are required. First, the objects must be extracted from the images. To do this, edges are detected from the image. This edge image is used to extract the objects from the image using color, location and visual features.

FIG. 8 explains the object extraction procedure with the help of four sets of images. The left images of the sets are the original images, the center images are the edge images and the right images represent the extracted objects from the images. As seen from the right images, the airplane from the image 01 and the yacht from image 02 were successfully extracted. The algorithm also extracted the clouds and sky from image 01 and clouds, sea and sky from image 02. However, the person in image 03 was divided into two regions because of the different color elements. In image 04, the two persons were merged into one region because of the closeness of the color, texture and position of each person. These gaps between the visual characteristics and semantic meaning of the image can lead to an image classification that is not expected by the users. In order to reduce region division and region merge effects and provide intuitive results, the edge images are used directly to evaluate the boundary of the objects.

Figure 9A:
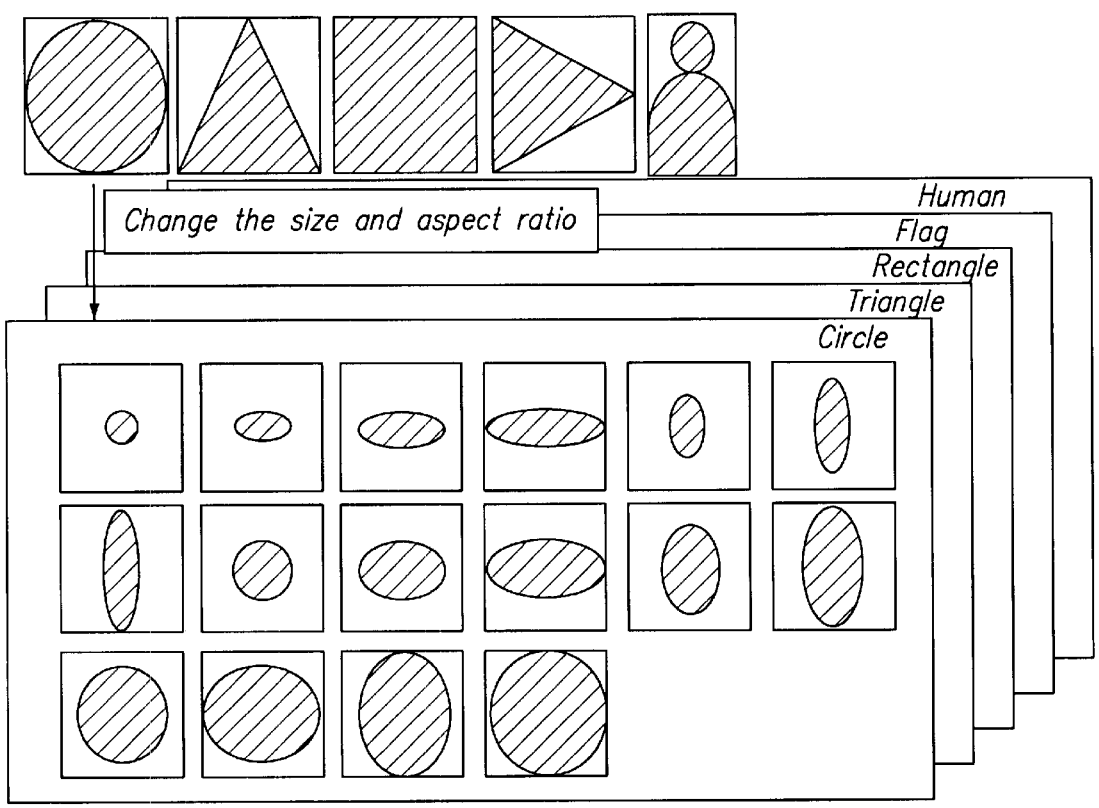
FIGS. 9(a) and 9(b) shows templates used to cluster images by primary object and also shows the clustering procedure.

Once the objects are extracted from the images, the second step is to evaluate the composition of the objects and cluster images based on the evaluation. Usually, there exist many different objects in one image and sometimes it is hard to extract the objects correctly. In addition, the objects contained in the images have a wide variety of shapes of different sizes. Due to these reasons it is very difficult to determine the cluster automatically, based upon the distribution of the visual attributes. Therefore, typical primary shapes like ellipses, rectangles and triangles of different sizes and aspect ratios are defined as templates and are used as clustering seeds to make a classification. Some of these templates are shown in FIG. 9(a).

Figure 9B:
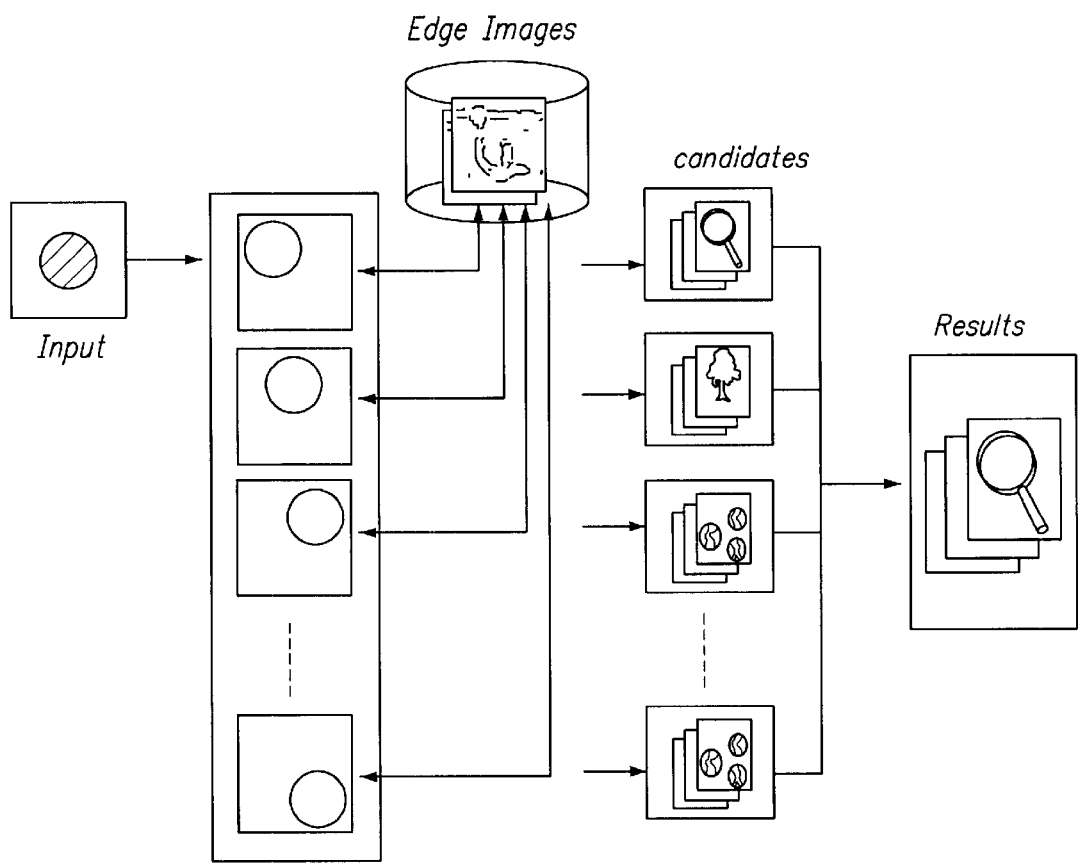

The clustering process uses a comparison algorithm to match the edge images with the input templates as shown in FIG. 9(b). The objects in the images do not usually have the same shape as the templates. There might exist some unevenness and the size might be different. In order to allow some flexibility, the algorithm considers the local correlation among the data during the comparison. The details of the comparison algorithm can be found in related application Ser. No. 09/064,061, the contents of which are incorporated herein by reference, entitled "Method and Apparatus for Image Querying Using Object Boundaries" to K. Hirata and assigned to the assignee of the present application.

To achieve location independence, several sets of images are created from the templates by shifting the objects and the comparison algorithm is called for each as shown in FIG. 9(b). Since the algorithm also allows for noise, images are created for every 15% shifting, for example. For each image of a category, a score determines its similarity to a template image of a given size and aspect ratio. If the score is greater than a threshold, the image belongs to the corresponding cluster.

Figure 10A:
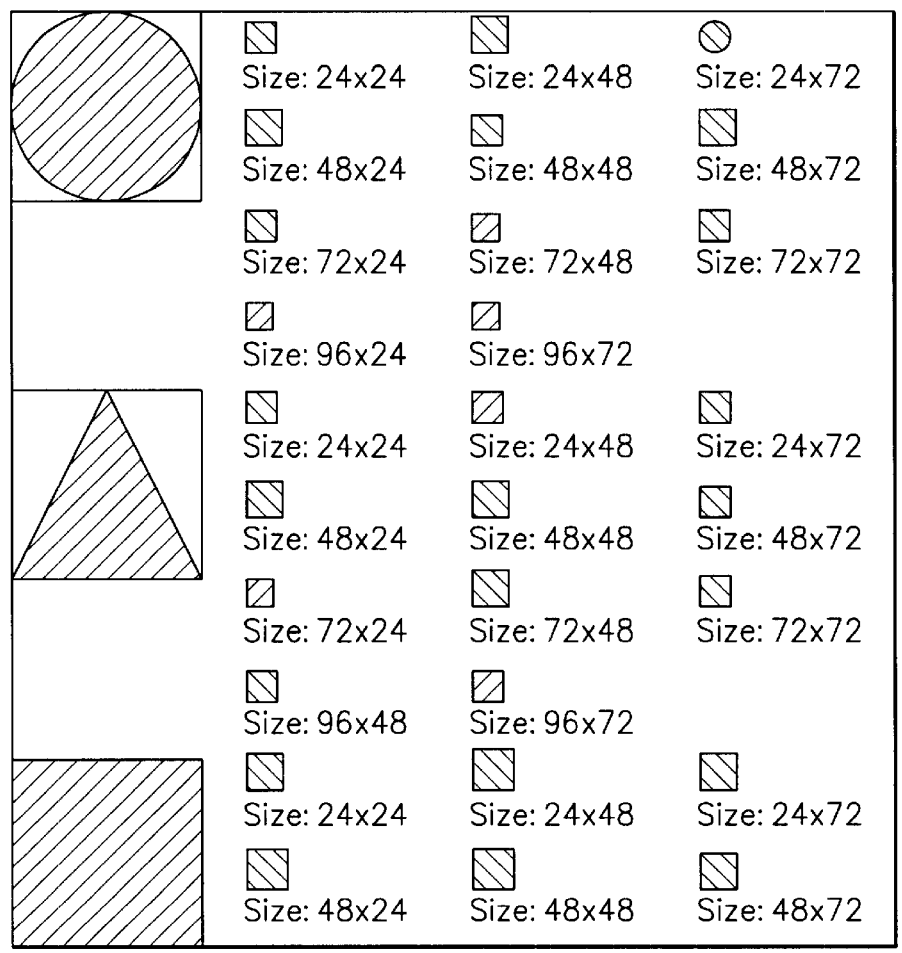
FIGS. 10(a) and 10(b) shown search results grouped according to primary object, along with the images for one of the groups, in accordance with an embodiment of the present invention.
Figure 10B:
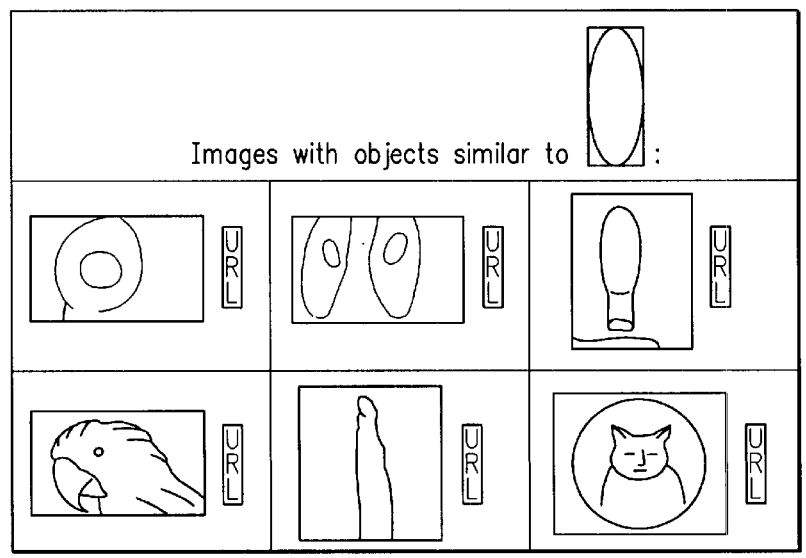

An example of image clustering is shown in FIGS. 10(a) and 10(b). Each image cluster is represented by a glyph in FIG. 10(a). The template image for the cluster is shown on the right and the size of the template that corresponds to a cluster is displayed at the bottom of the cluster's glyph. The size, shape and color of the glyphs are determined by the criteria described above. The user can click on a glyph to find the retrieved images containing objects similar to the template image of the given size and aspect ratio. It is also possible to retrieve all images for a cluster. For example, the top 6 images having an object similar to a 24×72 ellipse are shown in FIG. 10(b). Since querying is by keyword and the clustering is by image shape similarity, this gives the user another way of combining text and image searching. It should be noted that image clustering could also be used to organize the results of an image search.

Thus, in accordance with the present invention, a user of a search engine is provided with a method and apparatus for providing a user with an interface for refining the results of an original query by clustering the results of the original query in various ways.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for refining a first query applied to a database of images, the method comprising the steps of:

selecting one of a plurality of modes of clustering results of the first query, wherein the modes of clustering include clustering by one of text, image and Universal Resource Locator (URL); and retrieving cluster groups containing the results of the first query, the cluster groups having been clustered in accordance with the selected mode of clustering, wherein when the selected mode of clustering is clustering by text, the cluster groups have been formed in a preprocessing procedure comprising the steps of:

(a) representing each of the images in the database in a vector space model, where V represents a unique set of keywords assigned to the images, where each of the images is represented by a vector of length |V|;

(b) calculating a similarity value between each pair of the images, thereby forming a similarity matrix, wherein the similarity value is measured by the cosine of the angle between the vector of the respective images, the similarity value being further normalized to a value between 0 and 1;

(c) storing the similarity value in the similarity matrix only when the similarity value is greater than a first threshold value;

(d) clustering the images based on the normalized similarity value; and (e) determining a topic for each of the cluster groups; and the method for refining a first query filer comprising displaying the cluster groups, each of the cluster groups being visually represented by a graphical element; and refining the results of the first query using members of the cluster groups as elements of a refined query.

2. The method according to claim 1, wherein the database of images is a multimedia database.

3. The method according to claim 1, wherein te database of images is on the World Wide Web.

4. The method according to claim 1, wherein clustering by image includes clustering by color.

5. The method according to claim 1, wherein clustering by image includes clustering by primary shape.

6. The method according to claim 1, wherein the length |V| is calculated so that the absence of one of the keywords is indicated by a 0 and the presence of one of the keywords is indicated by a positive number representing the importance of the keyword, the frequency of assignment of the keyword in the image.

7. The method according to claim 1, wherein the preprocessing step further comprises the steps of:

(a) determining linking nodes, where each of the images is represented by a node, wherein nodes are linking nodes when the normalized similarity value between the pair of images is greater than a second threshold value;

(b) determining a set of connected components, the set of connected components being a set of the nodes where each of the nodes is linked to at least one other member of the set of nodes, the set of nodes in a connected component forming a cluster; and (c) repeating steps (a) and (b) by increasing the second threshold value when the cluster contains a large number of the images and the second threshold value is less than a maximum value of 1.0.

8. The method according to claim 1, wherein the step of determining a topic for each of the cluster groups comprises determining the keywords which are assigned to most of the images of the cluster.

9. The method according to claim 1, wherein the step of refining further comprises the steps of:

(a) selecting the graphical element representing a desired cluster group;

(b) displaying the members of the selected cluster group; and (c) selecting one of the displayed members as one of the elements of the refined query.

10. The method according to claim 1, wherein, when the selected mode of clustering is clustering by image, the cluster groups have been formed in a preprocessing procedure comprising the steps of:

(a) detecting edge images of each of the images in the database;

(b) comparing the edge images of each of the images with primary shape cluster templates; and (c) grouping the images into cluster groups by primary shape based upon similarity between the edge images of each of the images and the primary shape cluster templates.

11. The method according to claim 10, wherein the step of comparing compensates for unevenness in the edge images, small size differences between the edge images and the primary object cluster templates and shifting of objects in the images.

12. The method according to claim 10, wherein the step of grouping further comprises grouping into cluster groups by different sizes of the primary shape cluster templates.

13. The method according to claim 12, wherein the step of refining further comprises the step of selecting the graphical element representing a desired cluster group indicating a desired size of a desired primary shape cluster template.

14. The method according to claim 1, wherein when the selected mode of clustering is clustering by URL, the cluster groups have been formed by grouping the results by web sites from which the results come, wherein each web site represents one of the cluster groups.

15. The method according to claim 14, wherein a directory structure is shown for the web site represented by the graphical element representing a selected cluster group.

16. The method according to claim 14, wherein the step of refining further comprises the steps of:

(a) selecting the graphical element representing a desired cluster group;

(b) displaying the members of the selected cluster group; and (c) selecting one of the displayed members as one of the elements of the refined query.

17. The method according to claim 1, wherein the graphical element is a first shape when it is not selected and the graphical element is a second shape when it is selected.

18. The method according to claim 1, wherein a size of the graphical clement is proportional to the number of the members in the cluster group represented by the graphical element.

19. The method according to claim 1, wherein the graphical element is comprised of a first color component and a second color component, where the first color component is proportional to a maximum number of desired keywords in the members of the cluster group represented by the graphical element and where the second color component is proportional to a maximum image similarity between the first query and the members of the cluster group represented by the graphical element.

20. A system for refining a first query applied to a database of images, the system comprising:

a first computer, including a display; and a second computer executing an application program for providing a user of the computer with an option of selecting one of a plurality of modes of clustering results of the first query, wherein the modes of clustering include clustering by one of text, image and Universal Resource Locator (URL); wherein the first query is executed and the cluster groups containing the results of the first query are retrieved, the cluster groups having been clustered in accordance with the selected mode of clustering; wherein, the cluster groups are displayed on the display, each of the cluster groups being visually represented by a graphical element; wherein the user may refine the results of the first query using members of the cluster groups as elements of a refined query; and wherein, when the selected mode of clustering is clustering by text, in the application program, the cluster groups have been formed in a preprocessing procedure by:
(a) representing each of the images in the database in a vector space model, where V represents a unique set of keywords assigned to the images, where each of the images is represented by a vector of length |V|;
(b) calculating a similarity value between each pair of the images, thereby forming a similarity matrix, wherein the similarity value is measured by the cosine of the angle between the vector of the respective images, the similarity value being further normalized to a value between 0 and 1;
(c) storing the similarity value in the similarity matrix only when the similarity value is greater than a first threshold value,
(d) clustering the images based on the normalized similarity value; and
(e) determining a topic for each of the cluster groups.

21. The system according to claim 20, wherein the first computer and the second computer are the same computer.

22. The system according to claim 20, wherein the first computer is a client computer and the second computer is a host computer connected to the client computer.

23. The system according to claim 20, wherein the database of images is a multimedia database.

24. The system according to claim 20, wherein the database of images is on the World Wide Web.

25. The system according to claim 20, wherein clustering by image includes clustering by color.

26. The system according to claim 20, wherein clustering by image includes clustering by primary shape.

27. The system according to claim 20, wherein the length |V| is calculated so that the absence of one of the keywords is indicated by a 0 and the presence of one of the keywords is indicated by a positive number representing the importance of the keyword, the frequency of assignment of the keyword in the image.

28. The system according to claim 20, wherein in the application program, the preprocessing procedure further comprises:
(a) determining linking nodes, where each of the images is represented by a node, wherein nodes are linking nodes when the normalized similarity value between the pair of images is greater than a second threshold value;
(b) determining a set of connected components, the set of connected components being a set of the nodes where each of the nodes is linked to at least one other member of the set of nodes, the set of nodes in a connected component forming a cluster; and
(c) repeating (a) and (b) by increasing the second threshold value when the cluster contains a large number of the images and the second threshold value is less than a maximum value of 1.0.

29. The system according to claim 20, wherein a topic for each of the cluster groups is created by determining keywords which are assigned to most of the images of the cluster.

30. The system according to claim 20, wherein in the application program, the results are refined by:
(a) selecting the graphical element representing a desired cluster group;
(b) displaying the members of the selected cluster group on the display; and
(c) selecting one of the displayed members as one of the elements of the refined query.

31. The system according to claim 20, wherein, when the selected mode of clustering is clustering by image, in the application program the cluster groups have been formed in preprocessing procedure by:
(a) detecting edge images of each of the images in the database;
(b) comparing the edge images of each of the images with primary shape cluster templates; and
(c) grouping the images into cluster groups by primary shape based upon similarity between the edge images of each of the images and the primary shape cluster templates.

32. The system according to claim 31, wherein the comparing compensates for unevenness in the edge images, small size differences between the edge images and the primary object cluster templates and shifting of objects in the images.

33. The system according to claim 31, wherein the grouping groups into cluster groups by different sizes of the primary shape cluster templates.

34. The system according to claim 33, wherein results are refined by further selecting the graphical element representing a desired cluster group indicating a desired size of a desired primary shape cluster template.

35. The system according to claim 20, wherein when the selected mode of clustering is clustering by URL, in the application program, the cluster groups have been formed by grouping the results by web sites from which the results come, wherein each web site represents one of the cluster groups.

36. The system according to claim 35, wherein a directory structure is displayed on the display for the web site represented by the graphical element representing a selected cluster group.

37. The system according to claim 35, in the application program, the results are refined by:
(a) selecting the graphical element representing a desired cluster group;
(b) displaying the members of the selected cluster group on the display; and
(c) selecting one of the displayed members as one of the elements of the refined query.

38. The system according to claim 20, wherein the graphical element is a first shape when it is not selected and the graphical element is a second shape when it is selected.

39. The system according to claim 20, wherein a size of the graphical element is proportional to the number of the members in the cluster group represented by the graphical element.

40. The system according to claim 20, wherein the graphical element is comprised of a first color component and a second color component where the first color component is proportional to a maximum number of desired keywords in the members of the cluster group represented by the graphical element and where the second color component is proportional to a maximum image similarity between the first query and the members of the cluster group represented by the graphical element.

* * * * *

UNITED STATES PATENT AND TRADEMARK OFFICE
CERTIFICATE OF CORRECTION

PATENT NO. : 6,415,282 B1
DATED : July 2, 2002
INVENTOR(S) : Sougata Mukherjea et al.

It is certified that error appears in the above-identified patent and that said Letters Patent is hereby corrected as shown below:

<u>Column 9,</u>
Line 12, delete "filer" and insert -- further --.

Signed and Sealed this

Eighteenth Day of February, 2003

JAMES E. ROGAN
*Director of the United States Patent and Trademark Office*